US012233906B2

(12) United States Patent
Jenkins et al.

(10) Patent No.: US 12,233,906 B2
(45) Date of Patent: Feb. 25, 2025

(54) AUTONOMOUS VEHICLE OPERATION IN SNOW

(71) Applicant: Ford Global Technologies, LLC, Dearborn, MI (US)

(72) Inventors: Brendan Jenkins, Canton, MI (US); Tyler James-Ray Kaldobsky, Canton, MI (US); Daniel Sullivan, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 217 days.

(21) Appl. No.: 17/932,310

(22) Filed: Sep. 15, 2022

(65) Prior Publication Data
US 2024/0092388 A1 Mar. 21, 2024

(51) Int. Cl.
*B60W 60/00* (2020.01)
*B60S 1/08* (2006.01)
*B60W 40/06* (2012.01)
*B60W 50/00* (2006.01)
*G01W 1/10* (2006.01)
*G06V 20/56* (2022.01)

(52) U.S. Cl.
CPC ....... *B60W 60/0015* (2020.02); *B60S 1/0848* (2013.01); *B60W 40/06* (2013.01); *B60W 50/0097* (2013.01); *G01W 1/10* (2013.01); *G06V 20/588* (2022.01); *B60W 2420/403* (2013.01); *B60W 2520/28* (2013.01); *B60W 2520/30* (2013.01); *B60W 2552/50* (2020.02); *B60W 2555/20* (2020.02)

(58) Field of Classification Search
CPC ............ B60W 60/0015; B60W 40/06; B60W 50/0097; B60W 2420/403; B60W 2520/28; B60W 2520/30; B60W 2552/50; B60W 2555/20; B60S 1/0848; G01W 1/10; G01W 1/02; G06V 20/588
See application file for complete search history.

(56) References Cited

U.S. PATENT DOCUMENTS

| | | | |
|---|---|---|---|
| 8,849,505 B2 | 9/2014 | Menard et al. | |
| 9,915,090 B2 | 3/2018 | Beauvais | |
| 10,436,152 B2 | 10/2019 | Dudar | |
| 10,583,830 B2 | 3/2020 | Lavoie et al. | |
| 10,585,431 B2 | 3/2020 | Golgiri et al. | |
| 10,688,918 B2 | 6/2020 | Elangovan et al. | |
| 10,737,690 B2 | 8/2020 | Lavoie et al. | |
| 10,814,864 B2 | 10/2020 | Lavoie et al. | |
| 10,916,070 B1 | 2/2021 | Chan et al. | |
| 10,974,717 B2 | 4/2021 | Golgiri et al. | |
| 11,148,661 B2 | 10/2021 | Golgiri et al. | |
| 11,232,391 B1 | 1/2022 | Baalke et al. | |
| 2018/0181094 A1 | 6/2018 | Funk et al. | |
| 2020/0166946 A1* | 5/2020 | Langer | G05D 1/0276 |
| 2021/0063836 A1* | 3/2021 | Patterson | G02F 1/163 |
| 2021/0252983 A1* | 8/2021 | Nahrwold | B60L 58/12 |

FOREIGN PATENT DOCUMENTS

DE 102019104776 A1 8/2020

\* cited by examiner

*Primary Examiner* — Alan D Hutchinson
(74) *Attorney, Agent, or Firm* — Frank A. MacKenzie; Brooks Koshman P.C.

(57) ABSTRACT

Upon detecting an accumulation of snow on a driving surface, a driving path from a first location to a second location is identified. A vehicle is operated from the first location to the second location and then to a third location that is identical to or proximate to the first location.

20 Claims, 14 Drawing Sheets

AUTONOMOUS VEHICLE OPERATION IN SNOW

BACKGROUND

Vehicles equipped with suitable sensors and controller logic can operate in an autonomous mode. Fully autonomous vehicles may operate much as a vehicle driven by a human user without user oversight. In an autonomous mode, one or more vehicle computers may control vehicle propulsion, steering, and/or braking.

DETAILED DESCRIPTION

Figure 1:
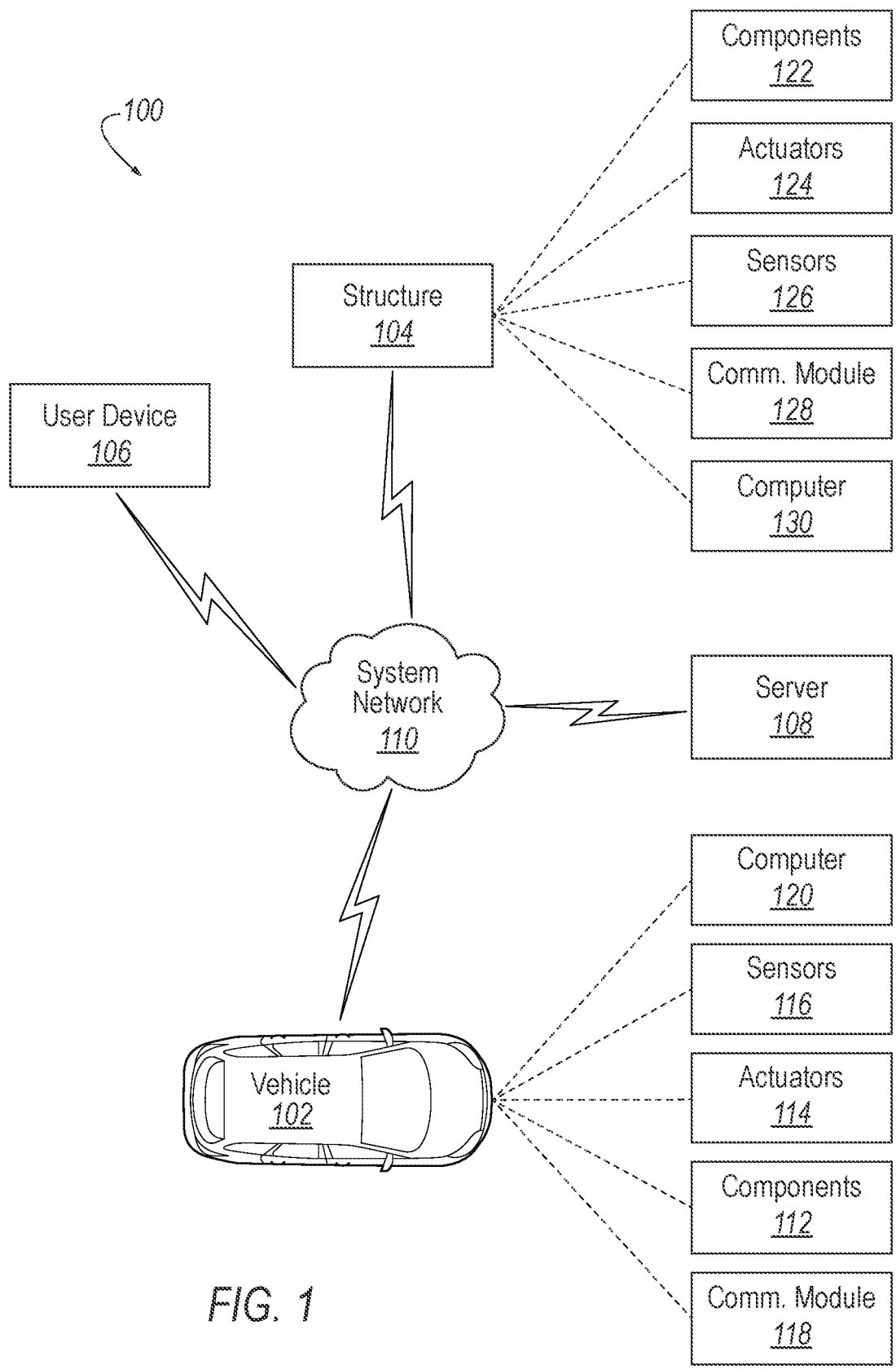
FIG. 1 is a block diagram illustrating an example control system for a vehicle.

As described herein, the vehicle may be autonomously operated to make tracks in snow. The vehicle may be autonomously operated even when a user is away from a structure such as a home so that the tracks in the snow will suggest that a user is present at the home. For example, the tracks may suggest ingress to or egress from the home. Vehicle tracks in a home's driveway may discourage a conclusion that the home is vacant or presently unoccupied. An autonomous vehicle may be parked in a first location, e.g., a residential location such as a driveway or garage of a home, for example. The vehicle typically includes a plurality of sensors and/or one or more communication modules for obtaining obtain data regarding the environment around the vehicle and providing the data to a vehicle computer. The vehicle can also include a communications interface for communicating with a user device that is remote from the vehicle. The vehicle computer can operate the vehicle based on the data received by the vehicle computer.

Advantageously, as described herein, the vehicle can be autonomously operated to generate vehicle tracks in the snow. A computing device, for example, the vehicle computer, or a remote computer, or a combination of computers, is programmed to detect snow on a driving surface such as a driveway of a residence. Upon detecting snow, the computing device identifies a driving path from a first location to a second location. An example first location is a parking area such as a garage, and the second location may be at or near an intersection of the driveway and a street. The computing device can operate the vehicle from the first location to the second location, and then to a third location that is identical to or proximate to the first location.

The computing device may be further programmed to direct the vehicle to particular locations, and/or address possible navigation difficulties, and/or to better simulate tracks that would be made by human users, and/or to reduce the risk of an observer determining that the vehicle is being operated without a human on board. To the extent that such features are not mutually exclusive, they may be combined with each other.

The computing device may be further programmed to, upon determining that there is an openable barrier disposed in the driving path, instruct the openable barrier to open prior to the vehicle reaching the openable barrier.

The computing device may be further programmed to instruct an openable barrier to close after the vehicle been operated to the third location and after the vehicle has passed the openable barrier.

The computing device may be further programmed to determine that the vehicle has reached the second location by determining that a vertical projection of a leading edge surface of the vehicle is in alignment with a street-to-driveway intersection.

The computing device may be further programmed to determine that the vehicle has reached the second location by determining that a contact point of a leading tire has reached a street-to-driveway intersection.

The computing device may be further programmed to determine that the vehicle has reached the second location by determining that the vehicle has entirely passed the street-to-driveway intersection.

The computing device may be further programmed to, when the second location is beyond the street-to-driveway intersection, instruct the vehicle to turn a pair of steerable wheels as the vehicle passes the street-to-driveway intersection in moving to the second location and to instruct the vehicle to turn the pair of steerable wheels as the vehicle is operated to the third location.

The computing device may be further programmed to operate the vehicle based on determining that a wheel rotating speed exceeds a wheel rotating speed threshold.

The computing device may be further programmed to, after the vehicle has been operated to the second location, identify a plurality of paths along which the vehicle is to move in accord with the following steps. A second driving path across the driving surface is identified. The second driving path extends between the second location and the third location. The vehicle is instructed to move along the second driving path to the third location. A third driving path across the driving surface is identified. The third driving path extends between the third location and a fourth location. The fourth location is identical to or proximate to the second location. The vehicle is instructed to move along the third driving path to the fourth location. A fourth driving path across the driving surface is identified. The fourth driving path extends between the fourth location and a fifth location. The fifth location is identical to or proximate to the first location. The vehicle is instructed to move along the fourth driving path to the fifth location.

The computing device may be further programmed to identify the third driving path after the vehicle has been operated to the third location and remained there for a predetermined period of time.

The computing device may be further programmed to acquire information from a camera to determine whether there has been an accumulation of snow on the driving surface.

The computing device may be further programmed to, prior to instructing the vehicle to move, address any snow obstructing the sensors in accord with the following steps. Whether any vehicle sensors are obstructed by snow is determined. If any of the vehicle sensors are obstructed by the snow, the vehicle is instructed to clear the snow. Whether the snow has been sufficiently cleared from the vehicle sensors is determined. If the snow has not been sufficiently cleared from the vehicle sensors, the vehicle is instructed to park in its then-current location.

The computing device may be further programmed to confirm receipt of an instruction from a user to enter a remote mode prior to instructing the vehicle to move.

The computing device may be further programmed to confirm that the first location is at a predetermined geographic location prior to instructing the vehicle to move.

The computing device may be further programmed to monitor a weather forecast for a forecast of snow. If it is determined that the weather forecast includes a forecast of snow, then the detection of snow accumulation is undertaken.

A method of responding to snow accumulation and variations of the method are set forth below.

A method of responding to snow accumulation on a driving surface proximate to a vehicle includes first includes a first step of determining whether there is an accumulation of snow on the driving surface. When it is so determined, a first driving path across the driving surface between a first location and a second location is identified. Then, the vehicle is operated to move along the driving path to the second location. The vehicle is then operated from the second location to a third location that is identical to or proximate to the first location.

The method may be supplemented to direct the vehicle to particular locations, and/or address possible navigation difficulties, and/or to better simulate tracks made by human users, and or to reduce the risk of an observer determining that the vehicle is being operated without a human on board. The following describes beneficial supplemental steps that may be included in the method as a supplement to the above description of the method. To the extent that such steps are not mutually exclusive, they may be combined with each other.

The method may further comprise the steps of determining whether there is a selectively openable barrier disposed in the driving path, and when it is so determined, instructing the barrier to open prior to the vehicle reaching the barrier.

The method may further comprise the step of instructing a barrier to close after the vehicle been operated to the third location and after the vehicle has passed the barrier.

The method may further comprise the step of determining that a vertical projection of a leading edge surface of the vehicle is in alignment with a street-to-driveway intersection as confirmation that the vehicle is at the second location.

The method may further comprise the step of determining that a contact point of a leading tire has reached a street-to-driveway intersection as confirmation that the vehicle is at the second location.

The method may further comprise the step of determining that the vehicle has entirely passed a street-to-driveway intersection to reach the second location.

The method may further comprise the steps of operating the vehicle to turn a pair of steerable wheels as the vehicle passes the street-to-driveway intersection in moving to the second location, and operating the vehicle to turn the pair of steerable wheels as the vehicle is operated to the third location.

The method may further comprise the step of determining when a wheel rotating speed exceeds a wheel rotating speed threshold as a limitation on the vehicle being able to respond to instructions on positioning the vehicle.

The method may further comprise the step of determining when a wheel torque exceeds a predetermined wheel torque threshold as a limitation on the vehicle being able to respond to instructions on positioning the vehicle.

The method may further comprise the step of operating the vehicle windows to darken prior to operating the vehicle to move.

The method may further comprise the steps of identifying a second driving path between the second location and the third location, and operating the vehicle to move along the second driving path to the third location.

The method may further comprise the step of operating the vehicle to clear any snow obstructing the vehicle sensors.

The method may further comprise the step of confirming receipt of an instruction from an operator to enter a remote mode prior to operating the vehicle to move.

The method may further comprise the step of confirming that the first location is at a predetermined geographic location prior to operating the vehicle to move.

The method may further comprise the step of determining that a weather forecast has issued a forecast for snow prior to operating the vehicle.

With reference to FIGS. 1-16, a system for making snow tracks and a method of making snow tracks are disclosed.

With particular reference to FIG. 1, an example vehicle snow track system 100 can include the following example elements: a vehicle 102, a structure 104, a user device 106, a server 108, and a system network 110. Each of the example elements are described in more detail below.

The vehicle 102 includes a plurality of vehicle components 112, a plurality of vehicle actuators 114, a plurality of vehicle sensors 116, some of which are responsive to the vehicle actuators 114, a vehicle communications module 118, and a vehicle computer 120.

In the context of the present disclosure, a vehicle component 112 is one or more hardware components adapted to perform a mechanical or electro-mechanical function or operation—such as moving the vehicle 102, slowing or stopping the vehicle 102, steering the vehicle 102, etc. Non-limiting examples of components 112 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The vehicle actuators 114 are implemented via circuits, chips, or other electronic and or mechanical components that can actuate various vehicle subsystems in accordance with appropriate control signals as is known. The actuators 114 may be used to control components 112, including braking, acceleration, and steering of a vehicle 102.

Vehicle sensors 116 may include a variety of devices such as are known to provide data to the vehicle computer 120. For example, the sensors 116 may include Light Detection And Ranging (LIDAR) sensor 116(s), etc., disposed on a top of the vehicle 102, behind a vehicle 102 front windshield, around the vehicle 102, etc., that provide relative locations, sizes, and shapes of objects surrounding the vehicle 102. As another example, one or more radar sensors 116 fixed to bumpers of the vehicle 102 may provide data to provide locations of the objects, second vehicles, etc., relative to the location of the vehicle 102. The sensors 116 may further alternatively or additionally, for example, include camera sensor(s), e.g., front view, side view, etc., providing images from an area surrounding the vehicle 102. As another example, the vehicle 102 can include one or more sensors 116, e.g., camera sensors 116, mounted inside a cabin of the vehicle 102 and oriented to capture images of users in the vehicle 102 cabin. In the context of this disclosure, an object is a physical, i.e., material, item that has mass and that can be represented by physical phenomena (e.g., light or other electromagnetic waves, or sound, etc.) detectable by sensors 116. Thus, the vehicle 102, as well as other items including as discussed below, fall within the definition of "object" herein. Additional example sensors 116 may also include steering sensors, drive motor sensors, brake sensor, wheel speed sensors, and battery sensors.

The vehicle communication module 118 allows the vehicle computer 120 to communicate with a remote computer (not shown) of the server 108; elements of the structure 104, including by way of example, a structure computer 130, and structure sensors 126; and/or the user device 106, by way of example, a messaging or broadcast protocol such as Dedicated Short Range Communications (DSRC), cellular, and/or other protocol that can support vehicle-to-vehicle, vehicle-to-structure, vehicle-to-cloud communications, or the like, and/or via the network 110.

The vehicle computer 120 includes a processor and a memory such as are known. The memory includes one or more forms of computer-readable media, and stores instructions executable by the vehicle computer 120 for performing various operations, including as disclosed herein. The vehicle computer 120 can further include two or more computing devices operating in concert to carry out vehicle 102 operations including as described herein. Further, the vehicle computer 120 can be a generic computer with a processor and memory as described above and/or may include a dedicated electronic circuit including an ASIC (application-specific integrated circuit) that is manufactured for a particular operation, e.g., an ASIC for processing sensor 116 data and/or communicating the sensor 116 data. In another example, the vehicle computer 120 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the vehicle computer 120.

The vehicle computer 120 may operate and/or monitor the vehicle 102 in an autonomous mode, a semi-autonomous mode, or a non-autonomous (or manual) mode, i.e., can control and/or monitor operation of the vehicle 102, including controlling and/or monitoring vehicle components 112. For purposes of this disclosure, an autonomous mode is defined as one in which each of vehicle 102 propulsion, braking, and steering are controlled by the vehicle computer 120; in a semi-autonomous mode the vehicle computer 120 controls one or two of vehicle 102 propulsion, braking, and steering; in a non-autonomous mode a human user controls each of vehicle 102 propulsion, braking, and steering.

The vehicle computer 120 may include programming to operate one or more of vehicle 102 brakes, propulsion (e.g., control of acceleration in the vehicle 102 by controlling one or more of an internal combustion engine, electric motor, hybrid engine, etc.), steering, transmission, climate control, interior and/or exterior lights, horn, doors, etc., as well as to determine whether and when the vehicle computer 120, as opposed to a human user, is to control such operations.

The vehicle computer 120 may include or be communicatively coupled to, e.g., via a vehicle communication network such as a communications bus as described further below, more than one processor, e.g., included in electronic controller units (ECUs) or the like included in the vehicle 102 for monitoring and/or controlling various vehicle components 112, e.g., a transmission controller, a brake controller, a steering controller, etc. The vehicle computer 120 is generally arranged for communications on a vehicle communication network that can include a bus in the vehicle 102 such as a controller area network (CAN) or the like, and/or other wired and/or wireless mechanisms.

Via the vehicle 102 communication network, the vehicle computer 120 may transmit messages to various devices in the vehicle 102 and/or receive messages (e.g., CAN messages) from the various devices, e.g., sensors 116, actuators 114, ECUs, etc. Alternatively, or additionally, in cases where the vehicle computer 120 comprises a plurality of computing devices that may be associated with particular components and systems of the vehicle 102, the vehicle communication network may be used for communications between the computing devices which may be represented as the vehicle computer 120 in this disclosure. Further, as mentioned below, various controllers and/or sensors 116 may provide data to the vehicle computer 120 via the vehicle communication network.

The vehicle computer 120 is programmed to receive data from one or more sensors 116, e.g., substantially continuously, periodically, and/or when instructed by the remote computer 108, etc. The data may, for example, include a location of the vehicle 102. Location data specifies a point or points on a ground surface and may be in a known form, e.g., geo-coordinates such as latitude and longitude coordinates obtained via a navigation system, as is known, that uses the Global Positioning System (GPS) and/or dead reckoning. Additionally, or alternatively, the data can include a location of an object, e.g., a vehicle 102, a sign, a tree, etc., relative to the vehicle 102. As one example, the data may be image data of the environment around the vehicle 102. In such an example, the image data may include one or more objects and/or markings, e.g., lane markings, on or along a road. Image data herein means digital image data, i.e., comprising pixels, typically with intensity and color values, that can be acquired by camera sensors 116. The sensors 116 can be mounted to any suitable location in or on the vehicle 102, e.g., on a vehicle 102 bumper, on a vehicle 102 roof, etc., to collect images of the environment around the vehicle 102.

In addition, the vehicle computer 120 may be configured for communicating via the vehicle communication module 118 and the system network 110 to intersection with devices outside of the vehicle 102, e.g., with the structure 104, the user device 106, and the server 108, using wireless communications (cellular and/or DSRC., etc.) or direct radio frequency communications. The communication module 118 could include one or more mechanisms, such as a transceiver, to facilitate such communication, and may employ any desired combination of wireless (e.g., cellular, wireless, satellite, microwave and radio frequency) communication mechanisms and any desired network topology (or topologies when a plurality of communication mechanisms are utilized). Exemplary communications provided via the communications module 118 include cellular, Bluetooth, IEEE 802.11, Ultra-Wideband (UWB), Near Field Communication (NFC), dedicated short range communications (DSRC), and/or wide area networks (WAN), including the Internet, providing data communication services.

The remote server 108 can be a conventional computing device, i.e., including one or more processors and one or more memories, programmed to provide operations such as disclosed herein. Further, the remote server 108 can be accessed via the network 110, e.g., the Internet, a cellular network, and/or or some other wide area network, particular forms of which may be characterized as a cloud server 108.

The network 110 represents one or more mechanisms by which a vehicle computer 120 may communicate with remote computing devices, e.g., the remote computer of the server 108, another vehicle computer, etc. Accordingly, the network 110 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 135 include wireless communication networks (e.g., using Bluetooth®, Bluetooth® Low Energy (BLE), UWB, NFC, IEEE 802.11, vehicle-to-vehicle (V2V) such as Dedicated Short Range Communications (DSRC), etc.), local area networks (LAN) and/or wide area networks (WAN), including the Internet, providing data communication services).

An example user device 106 may be provided by a smartphone 106 or a purpose-specific wireless communication device incorporating a suitable vehicle control software application. The user device 106, like other elements of the snow track system 100, may include hardware suited to connecting to wireless communication networks (e.g., using Bluetooth®, Bluetooth® Low Energy (BLE), UWB, NFC, IEEE 802.11, vehicle-to-vehicle (V2V) such as Dedicated Short Range Communications (DSRC), etc.), local area networks (LAN) and/or wide area networks (WAN), including the Internet, providing data communication services).

The structure 104 can include structure components 122, structure actuators 124, the structure sensors 126, a structure communications module 128, and the structure computer 130.

The example structure 104 (see FIGS. 1 and 5-8) includes structure components 122 which can include a parking area 132. The parking area 132 may be in the form of, by way of example, a garage, a carport, or a parking pad. The parking area 132 may be associated with additional features, such as a building structure 134, such as a house. A driving surface 136 may extend from the parking area 132. Examples of the driving surface 136 can include a driveway 136 and/or a parking lot. The driving surface 136 may also include a street 138. As described below, the driving surface 136 may alternatively be exclusive of the street 138, in which case the driving surface 136 may extend from the parking area 132 to the street 138.

An additional structure component 122 can be an openable barrier 140, by way of example, a garage door 140 or a gate (not shown), disposed between the parking area 132 and the driving surface 136.

The structure actuators 124 can include a garage door opener comprising a motor and a linkage (not shown) connected to the garage door 140, that is, the example openable barrier 140. The garage door opener 124 actuates, that is, opens and closes, the garage door 140.

The structure sensors 126 can include, by way of example, load sensors able to indicate a closure load applied by the openable barrier 140 and position sensors able to indicate a position of the barrier 140 which together can be used to determine that the barrier 140 has properly closed. Additional structure sensors 126 can include an obstacle sensor with one example being a combination of a light beam and an electric eye, and another example being the use of the above references load sensor in combination with the barrier position sensor, both of which are commonly used in commercially available garage doors, such as that shown in a "Craftsman Garage Door Opener Owner's Manual" ©2011 Sears, Roebuck and Co., with a copy available at https://www.manualslib.com/manual/486543/Craftsman-Garage-Door-Opener.html?page=76 #manual. It is also possible that a structure computer 134 could command barriers 140 to operate, e.g., as is presently done via smartphone apps in commercially available products. Such an ability is described, for example, on the webpage https://www.creativedoor.com/residential-products/residential-access-controls.

The structure sensors 126 may also include one or more sensors such as described above for the vehicle sensors 116, e.g., LIDAR, radar, cameras, ultrasonic sensors, etc. The sensors 126 may be fixed or stationary, and may be fixed to any of the structure components, including by way of example, the building structure 134, the garage 132, and/or an open area proximate to the driving surface 136, such as a lawn or a recreation area, for example a basketball court or a tennis court or an ice rink. The structure sensors 126 can communicate with the structure computer 126 via a wired connection or a wireless connection. Although not shown for ease of illustration, the structure 104 also includes a power source such as a battery, solar power cells, and/or a connection to a power grid. The structure sensors 126 can provide an external perspective of the vehicle 102 and can sometimes detect features and characteristics of objects not in the vehicle sensors 116 field(s) of view and/or can provide more accurate detection, e.g., with respect to a location of the vehicle 102 and/or the vehicle's 102 movement with respect to other objects.

The structure computer 130 and the structure communications module 128 may be configured like the vehicle computer 120 and the vehicle communications module 118, the details of which are not repeated here to avoid redundancy.

Figure 3:
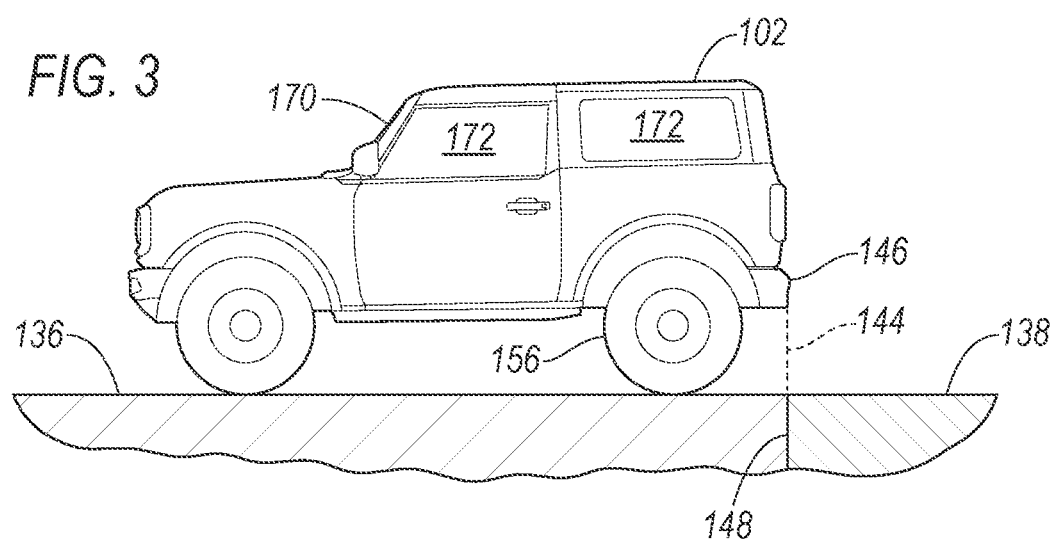
FIG. 3 is a side view of a vehicle at an alternative example location relative to a street-to-driveway intersection.
Figure 5:
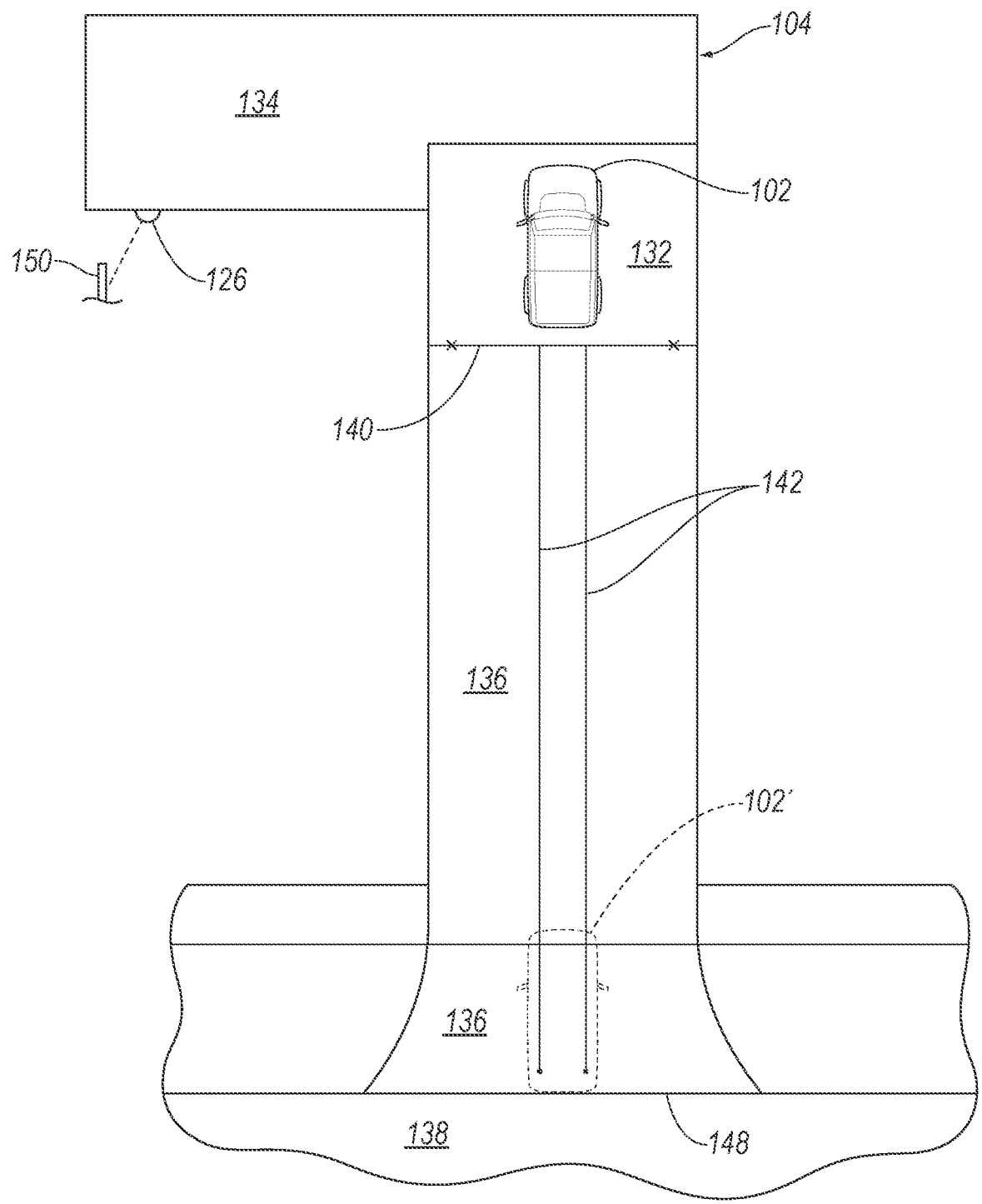
FIG. 5 is a plan view of an example structure site and a first example driving path.

FIG. 5 shows the vehicle 102, illustrated in solid lines, in the garage 132 in a first location. Each location of the vehicle 102 will be distinguished with one or more prime (') marks. The vehicle 102 is illustrated in phantom lines and labeled 102' in its second location instead of 102 to distinguish the vehicle in its first location (102) from the vehicle in its second location (102'). The vehicle 102' in the second location is located on the driving surface 136, and more particularly, on an apron of the driveway 136. An example first driving path 142 is illustrated between the first location and the second location. FIG. 3 shows a side view of the vehicle 102 of FIG. 5, illustrating that a vertical projection 144 of a leading edge surface 146 of the vehicle 102 is in alignment with a street-to-driveway intersection 148. In the present example, the street 138 is not part of the driving surface 136.

Snow, i.e., an accumulation of snow, may be detected on a driving surface 136 using any suitable means. For example, FIG. 5 also shows an example structure sensor 126 serving as a snow sensor. The example snow sensor 126 can include a camera 126 mounted to a side of the building structure 134, or the garage 132, or post or any other stationary feature. The camera 126 can be directed toward a scale 150 in a location suitably proximate to the driving surface 136. The scale 150 can be vertically oriented and may be fixed directly or indirectly to the ground. The scale 150 may be graduated like a ruler in any suitable measure of distance, including, for example, centimeters, or inches, or any arbitrary scale that may be known to at least one of the structure computer 130 and the vehicle computer 120. The scale 150 can be disposed suitably proximate to the driving surface 136 when an accumulation of snow at the scale 150 will occur when there is an accumulation of snow on the driving surface 136. The camera 126 and scale 150 combination may be used to confirm that snow has fallen on the driving surface 136. Any commercially available snow sensor may be used as a snow sensor. See, e.g., https:// mobalysis.com/snow-cam-alert-platform. As yet another alternative, the camera 126 could take pictures of the driveway with any one of the structure computer 130 and the vehicle computer 120 and the server 108 employing image recognition to discern when there is an accumulation of snow on the driveway 136. Yet alternatively, weather forecasts may be monitored for forecasts of snow from the server 108. A forecast of snow may be treated as an accumulation of snow on the driving surface 136. Such a reliance on forecasts could eliminate a need for directly measuring accumulation of snow on the driving surface 136 and the need for the snow sensor 126. As a further alternative, a forecast of snow may be used as a trigger to measure snow accumulation with the snow sensor 126 at the location of the driving surface 136.

Figure 2:
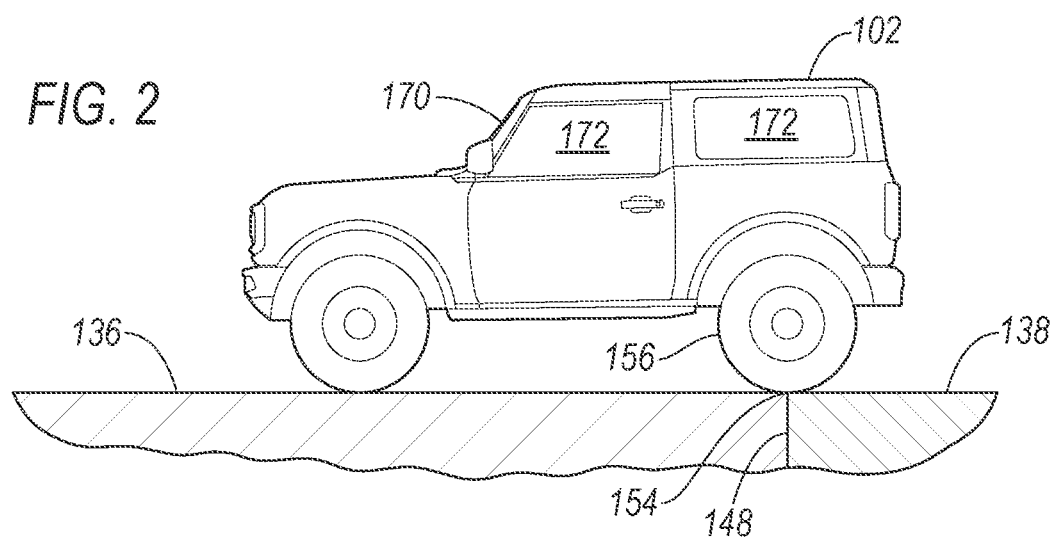
FIG. 2 is a side view of a vehicle at an example location relative to a street-to-driveway intersection.
Figure 6:
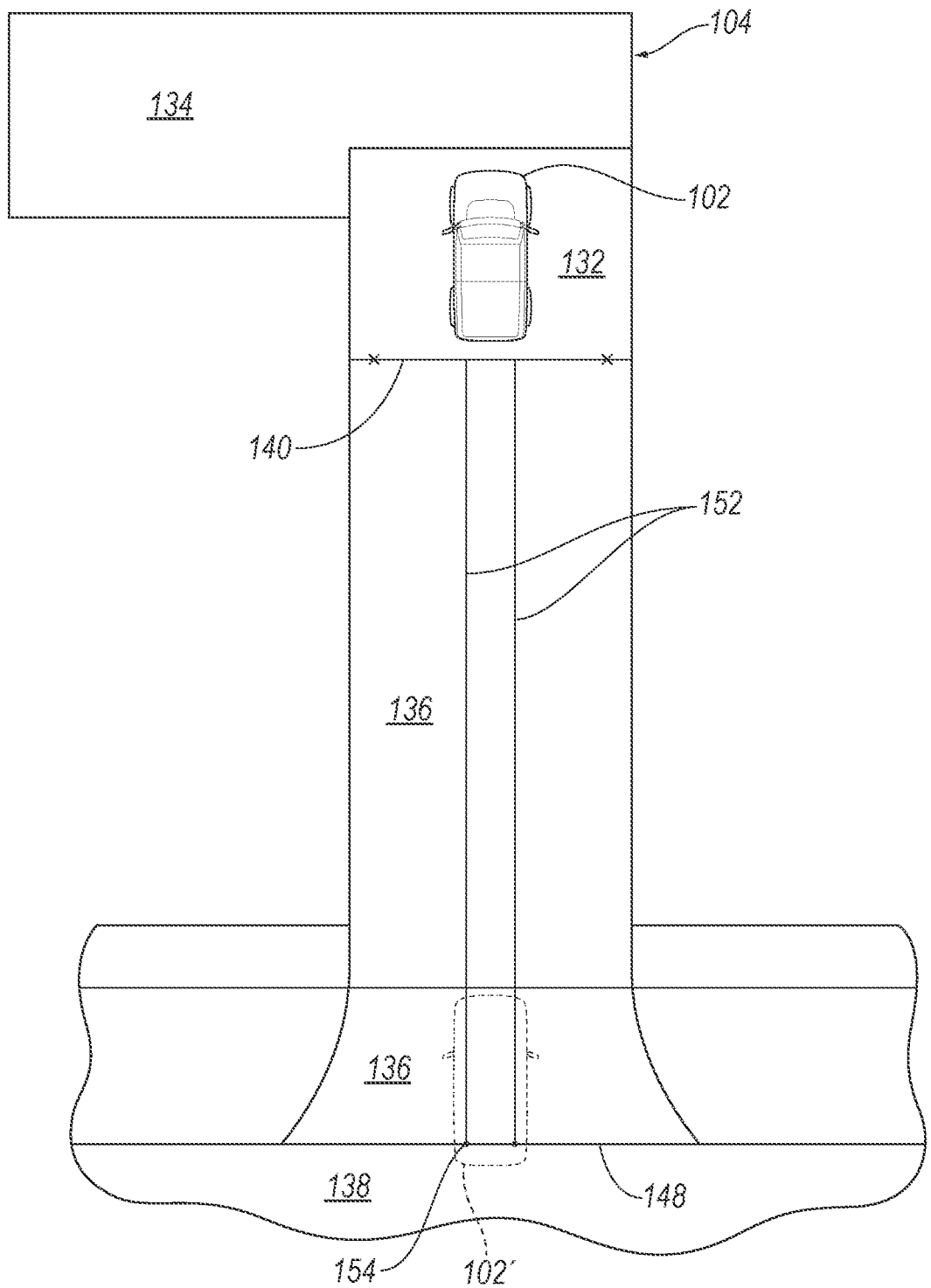
FIG. 6 is a plan view of the example structure site of FIG. 5 and a second example driving path.

FIG. 6 is much like FIG. 5, but with the vehicle 102' in an alternative second location. The vehicle 102, illustrated in solid lines, is in the garage 132 in the first location. The vehicle 102', illustrated in phantom lines, is located in an alternative second location on the driving surface 136. A second example first driving path 152 is illustrated between the first location and the second location. FIG. 2 shows a side view of the vehicle 102 of FIG. 6, illustrating that a contact point 154, i.e., a center of a contact patch, of a leading tire 156 has reached the street-to-driveway intersection 148. As in the example of FIGS. 5 and 3, the street 138 is not part of the driving surface 136. Although not illustrated, the structure 104 may include a snow sensor.

Figure 7:
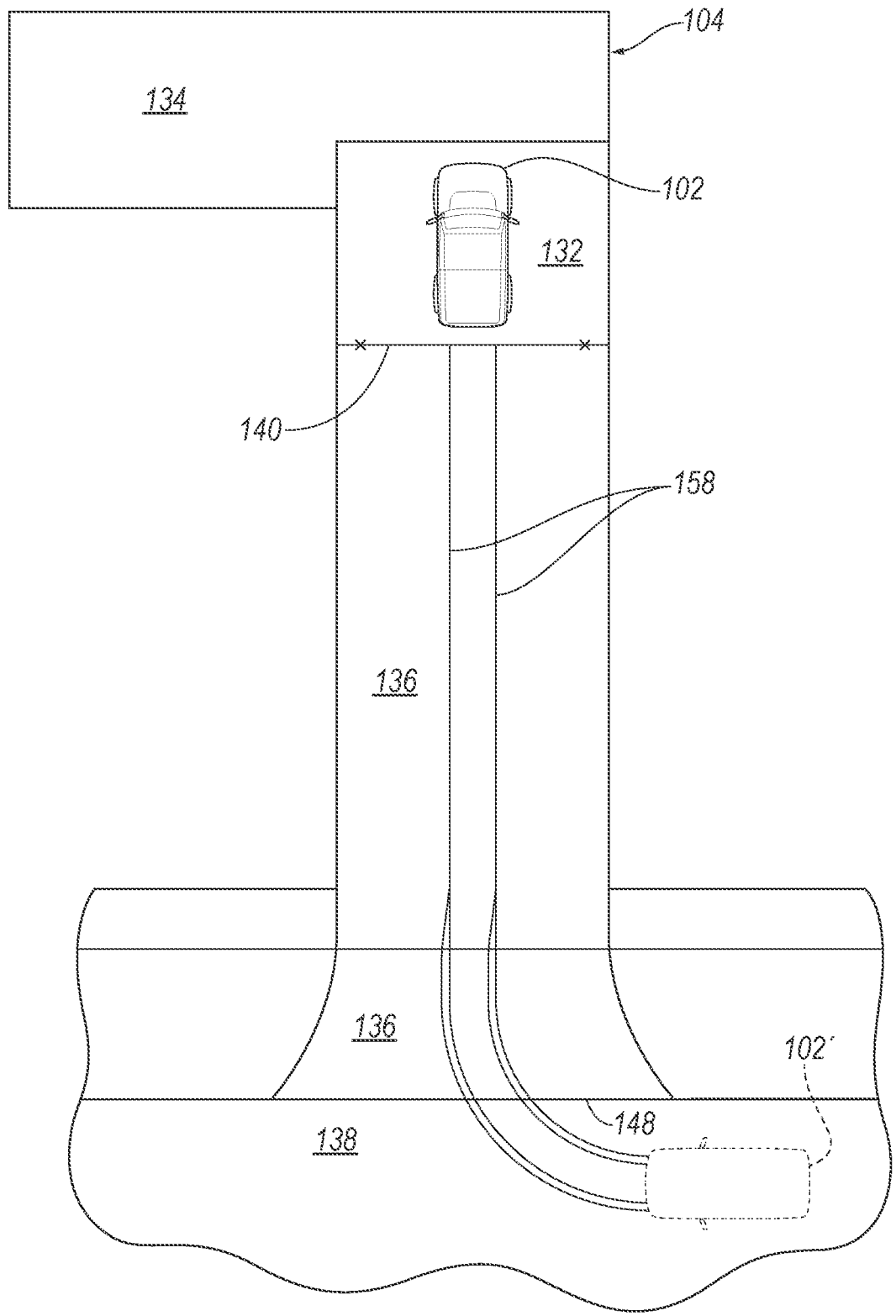
FIG. 7 is a plan view of the example structure site of FIG. 5 and a third example driving path.

FIG. 7 is distinguished from FIG. 5 and FIG. 6 in that the vehicle 102 enters the street 138 and the street 138 comprises part of the driving surface 136. The alternative second location is in the street 138. The vehicle 102, illustrated in solid lines, is in the garage 132 in the first location. The vehicle 102', illustrated in phantom lines, is located in a second alternative second location on the driving surface 136, and more particularly, in the street 138. A third example first driving path 158 is illustrated between the first location of the vehicle 102 and the second location of the vehicle 102' and includes an arcuate portion as a result of the vehicle 102 turning into the street 138. The vehicle 102 is directed to turn its steerable wheels, typically a pair of wheels at a front of the vehicle 102, as the vehicle passes the street-to-driveway intersection 148. The wheels are similarly turned when the vehicle 102 returns to the parking area 132. The driving path 158 schematically reflects the divergence between tracks from the front tires and tracks from the rear tires as the vehicle 102 takes an arcuate path to enter the street. Generating tracks following the driving path 158 exhibiting such an arc may enhance suggesting that the vehicle 102 is in use by residents of the building structure 134, and that the house is actively occupied, than tracks going to the end of the driveway with no indication of turning. Although not illustrated, the structure 104 may include a snow sensor 126 like that shown in FIG. 5 or any commercially available snow sensor.

Figure 8:
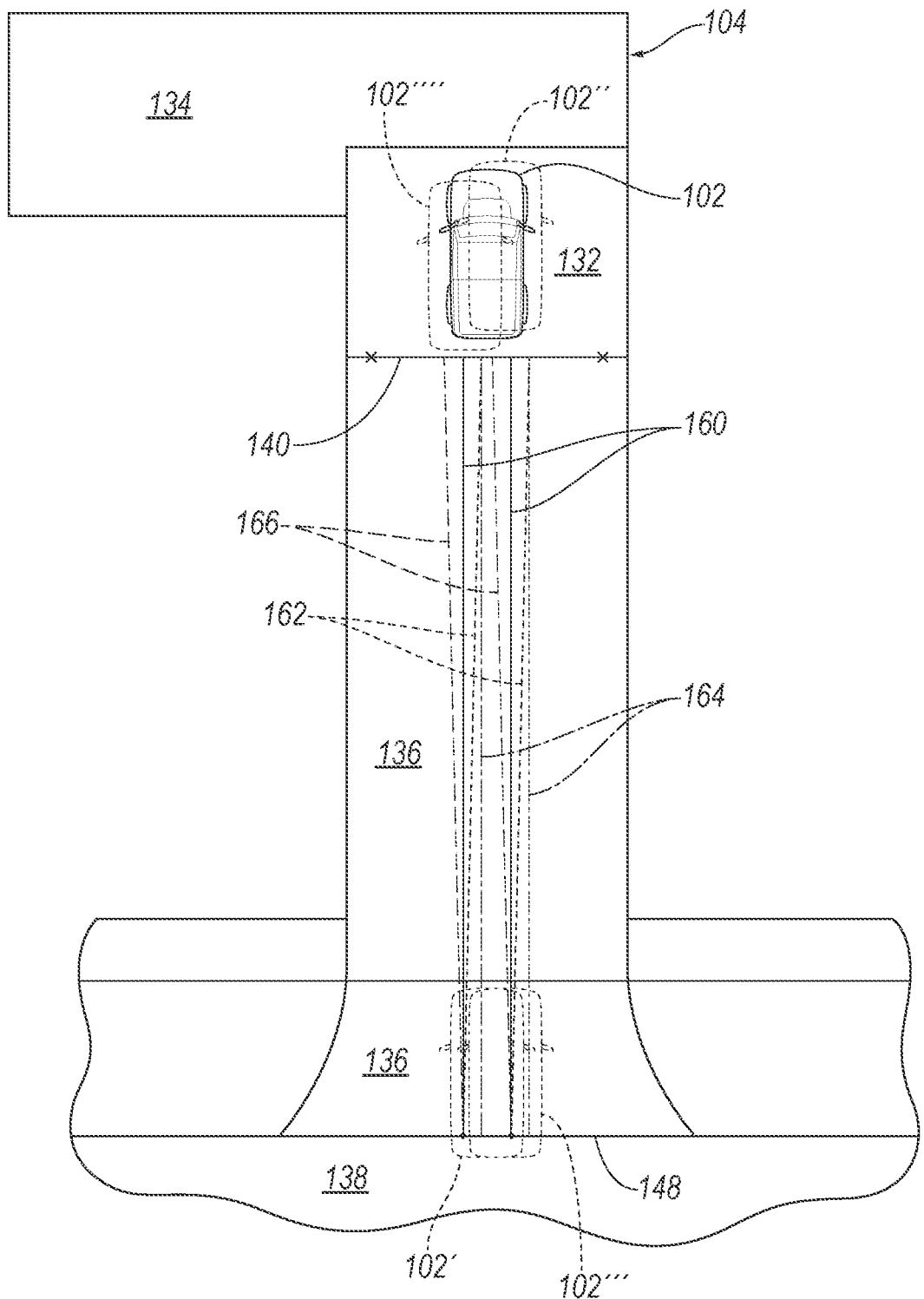
FIG. 8 is a plan view of the example structure site of FIG. 5 and a plurality of example driving paths.

FIG. 8 is much like FIG. 6, but the vehicle 102 makes multiple passes on the driving surface 136, with the driving paths not always being the same, and with, accordingly, a location of the vehicle 102 at a terminus of the driving paths being slightly different. The vehicle 102 starts in in the garage 132 in a first location. The vehicle 102 follows an example first driving path 160 to an example second location as shown by the vehicle 102'. An example second driving path 162 connects the example second location of the vehicle 102' with an example third location of the vehicle 102" that is proximate to the example first location of the vehicle 102. The third location is shown as proximate to the first location, but may alternatively be identical to the first location. An example third driving path 164 connects the third location of the vehicle 102" with a fourth location of the vehicle 102''' that is proximate to the second location of the vehicle 102'. The fourth location may be identical to the second location. An example fourth driving path 166 connects the fourth location of the vehicle 102''' with a fifth location of the vehicle 102'''' that is proximate to the first location of the vehicle 102. The fifth location can be identical to the first location. The vehicle 102 will stop at each of the first through fifth locations. Employing multiple driving paths is intended to enhance the simulation of a human driver entering and leaving the parking location 132 by providing at least some slight variation in the tracks. The generation of such tracks could be spaced out over predetermined periods of time, such as once per day or twice per day, preferably at times where movement of the vehicle 102 is not likely to be directly observed. It is also preferable that the times be varied to avoid establishing a machine-like pattern that could be noted by a person that might be monitoring activity at the home. One alternative is to have subsequent movements of the vehicle 102 from the parking are 132 occur only after additional snow accumulation. Although not illustrated, the structure 104 may include a snow sensor.

Whether locations are proximate can depend on the space available for maneuvering the vehicle. For example, if the parking area 132 is inside a two-car garage that only has the subject vehicle in it, with all the remaining space being available, any location within the garage may be considered proximate as between the original location in the garage and a returning location. An example proximate location is within 10 feet of a reference location. Similarly, if the driveway 136 is the width of two cars at the street-to-driveway intersection 148, a proximate location can be anywhere in the width of the driveway. Again, an example proximate location is within 10 feet of the reference location.

Figure 4:
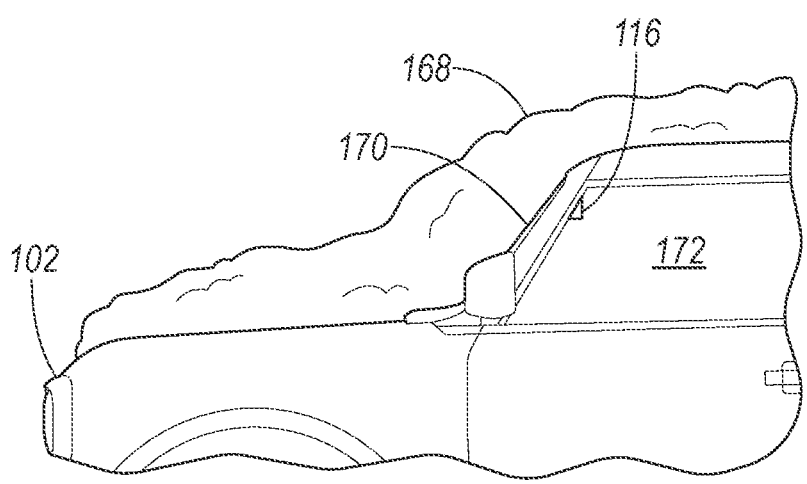
FIG. 4 is a side view of a vehicle with snow disposed over the vehicle.

FIG. 4 shows the vehicle 102 partially covered with snow 168, and with the snow 168 blocking a vehicle sensor 116. Such a circumstance may arise if the parking area 132 is uncovered. When the vehicle sensor 116 is blocked, and the vehicle computer 120 determines that there is a likelihood that the blockage may be due to an accumulation of snow 168 based on available data, e.g., temperature data from vehicle sensors 116, weather forecasts, data from structure sensors 126, the vehicle computer 120 may instruct a vehicle component 112 to be actuated to aid in clearing the sensor 116. By way of example, the vehicle sensor 116 of FIG. 4 is disposed in a passenger compartment, behind a windshield 170. Given that one of the vehicle sensors 116 detects an ambient temperature of below the freezing point of water, 0° C. or 32° F., and perhaps supplemented by additional data from the structure 104, for example an indication of snow accumulation, or a prediction of snow from the server 108, the vehicle computer 120 may be programmed to determine that it is likely that there is an accumulation of snow 168 over the windshield. The vehicle computer 120 may then instruct a vehicle actuator 114, e.g., a windshield heater electronic controller, to increase a temperature of the windshield 170 in an effort to clear the windshield, and thus clear the sensor 116. Once the sensor 116 is sufficiently operational, it may then be possible to have the vehicle 102 move along the driving path 142, 152, 158. 160, 162, 164, 166.

The system 100 may be operated in the following manner.

The vehicle computer 120 can receive data from sensors 116 and/or from the server 108. The vehicle may also receive data from the user device 106 and may additionally receive data from the structure 104. The vehicle computer 120 is programmed to, upon determining that snow has fallen on a driveway surface proximate to the vehicle 102, identify a driving path from a first location to a second location, and operate the vehicle from the first location to the second location and then to a third location that is identical to or proximate to the first location.

A computing device, inclusive of at least the vehicle computer 120, and possibly including one or all of the structure computer 130 and the server 108 and the user device 106, is programmed to direct the vehicle 102 to make tracks in the snow in the driveway when there is an accumulation of snow proximate to the vehicle, as, for example, on the driveway 136. A vehicle user would, for example by using a smart-phone software application in their smart phone 106 or a personal computer or any other suitable user device, place the vehicle in a remote mode. The remote mode may be employed by the user when they expect to be away from the building structure 134 and the parking area 132. As the user may be remote from the vehicle 102 at the time such instructions are provided, the vehicle 102 may be required to not move from its parked location unless the system 100 is able to first confirm that the vehicle 102 is at a predetermined geographic location such as the parking area 132 at the user's home that the user wants to make appear occupied. It would be undesirable for the vehicle 102 to be making tracks in a public location, as for example in an airport parking lot. As yet another protective measure, the computing device 120, 130, 108 may request the user, via the user device 106, to confirm that the user wants to enable the vehicle 102 to enter the remote mode and generate snow tracks.

The user may provide a window of time during which the system may operate the vehicle 102 autonomously to make snow tracks. For example, a smart phone app could allow the user to provide input to place the vehicle in a snow-track mode, e.g., at a current time or at a specified future date and/or time, and could further provide input as to a date and/or time when the vehicle should be removed from the snow-track mode. Thus, the user could provide an "operating window" for the snow-track mode. Such input may then be provided to the vehicle computer 120 which then directs the vehicle 102 to make tracks in the snow when there is an accumulation of snow. Alternatively, the vehicle computer 120 may, upon the establishment of an operating window, direct the vehicle 102 to make tracks in the snow during the operating window upon determining that there is an accumulation of snow.

To determine if there is an accumulation of snow, the vehicle computer 120 periodically checks for snow. Such checks may include either or both monitoring weather forecasts for snow predictions, and monitoring data from the snow sensor 126. As an example of using both forecasts and the snow sensor 126 to assess accumulation, data from snow sensors 126 may be assessed only after there is a forecast for snow. When snow accumulation is detected, the vehicle computer 120 initiates an autonomous routine. A basic response to any determination of snow by the system 100 is to direct the vehicle 102 to make track at any indication of snow as an indication of accumulation, with no minimum depth of accumulation. In another example, the system 100 can be programmed to employ additional discretion, and direct the vehicle to make tracks when weather conditions are suitable for maintaining snow on the driving surface for more than 24 hours. For example, if half a centimeter of snow is detected, and the ambient outdoor temperature at the driving surface 136 is 2° C. or 35° F., and/or the sun is shining on the driving surface 136, then the vehicle 102 would not be directed to move across the driving surface 136. A target accumulation magnitude, if any, may accordingly vary with factors including anticipated weather conditions such as expected high temperatures and available sunshine in the next 24 hours. Temperatures at or near freezing in combination with sunshine increase the likelihood that low levels of snow accumulation, for example, 1 cm, may dissipate from the driving surface within 24 hours. Accordingly, one example prerequisite magnitude to initiate vehicle movement may be 2 cm. However, if the forecast is for cold, cloudy weather, the magnitude to initiate vehicle movement may be 1 cm. Thus, the computer 120 may be programmed to periodically or continuously monitor weather forecasts for a forecast of snow, e.g., by querying a remote server for weather data as a supplement to snow measurements provided by the snow sensor 126. If it is determined that the weather forecast includes a forecast of snow, then the detection of snow accumulation is undertaken. If the vehicle is in a garage 132 behind a garage door 140, or behind any other barrier 140, such as a gate (not shown), the barrier 140 will be opened to allow the vehicle 102 to move past the barrier 140. Confirmation of the barrier 140 being open, and therefore passable, may be made by the vehicle computer 120 responsive to signals from the vehicle sensors 116 prior to the vehicle 102 being instructed to move. Alternatively, confirmation of the barrier being open may be provided to the vehicle computer by a signal from the structure computer 130 responsive to data from the structure sensors 126. The computing device identifies a driving path from the first location to a second location, such as an end of a driveway 136. The vehicle 102 will be instructed by the computing device to follow the driving path to the second location, and to then return to the first location or a location proximate to the first location. When a barrier 140 has been opened to allow the vehicle 102 to move to the second location, the barrier 140 is closed on the return of the vehicle to the first location or a location proximate thereto.

Any of the vehicle sensors 116 and structure sensors 126 may be used to determine when the vehicle 102 has successfully reached the second location, or any other location. FIGS. 5 through 8 illustrate multiple alternative locations as described above. Factors extraneous to the ability to control the vehicle 102, such as ease of implementation, may be considered in determining exactly where a second location of the vehicle 102' should be. For example, the second location of the vehicle 102' in FIGS. 3 and 5 avoids the street 138 entirely, minimizing the need to be aware of passing traffic when moving the vehicle 102. The second location of the vehicle 102' in FIGS. 2 and 6 and 8 intrudes into the street very slightly, suggesting that it would be best to have an awareness of passing traffic. The second location of the vehicle 102' in FIG. 8, which is fully in the street 138, clearly requires an awareness of passing traffic.

As noted in the discussion above of FIG. 4, actuators 114 may be employed to actuate window heaters 112 (and alternatively or additionally, any other suitable mechanism for removing occlusions and the like from sensors 116 may be employed) when the vehicle is covered with snow and/or ice prior to initiating any movement of the vehicle 102. This can beneficially not only enable the use of sensors behind any of the vehicle windows, but can also make it seem more likely to an observing passerby that the vehicle is being driven by a human user. If it is not possible to clear snow from all necessary sensors that are blocked or impaired by snow, the vehicle 102 may be directed to stay parked in its then-current location.

Including programming to darken the vehicle windows, including the windshield 170 and side windows 172 and a rear window of the vehicle 102 prior to the vehicle being instructed to move may enhance the difficulty of passersby of detecting that the vehicle 102 is being operated without a human driver. Any suitable mechanism for darkening vehicle windows may be employed. See, e.g., https://www-.continental.com/en/press/press-releases/2019-07-25-intelligent-glass-control/.

The computing device, including at least the vehicle computer 120, may also be programmed to respond to circumstances in which the vehicle 102 is not able to follow the selected driving path 142, 152, 158, 160, 162, 164, 166. For example, if the vehicle 102 encounters unanticipated resistance to movement and increasing wheel torque as provided to the wheel by the drive motor exceeds a wheel torque threshold without overcoming the obstacle, the vehicle 102 may be directed to reverse direction, away from the obstacle. An appropriate maximum wheel torque threshold may depend on a combination of factors including available drive motor torque, gear ratios between the drive motor and the wheel, the availability of traction control to limit the rotation of other driveline components, and the rolling radius of the subject wheel and tire combination. One example threshold torque value is 2000 Nm. Once the vehicle 102 is able to move freely, it may be directed to return to the parking area 132 if the parking area is not in the blocked direction. If the vehicle 102 is prevented from returning to the parking area 132, it may be parked at the point where it was blocked. If the barrier 140 is open and the vehicle 102 is located on the driveway 136 in a location not interfering with closing the barrier, the barrier 140 may be closed after parking the vehicle 102 with the vehicle remaining off the parking area 132 and outside of the barrier 140.

Somewhat similarly, if the vehicle 102 encounters excessively slippery conditions with associated wheel slippage, and a wheel rotates at a speed exceeding a threshold, the vehicle may be directed to reverse direction in an effort to improve traction. If the vehicle is able to regain sufficient traction to return to the parking area 132, it will be directed to do so. If it is unable to regain sufficient traction, the vehicle 102 will be directed to park at its current location. So long as the vehicle 102 is not in a location interfering with closing the barrier, the barrier 140 will be closed after parking the vehicle with the vehicle remaining off the parking area 132 and outside of the barrier 140.

Any suitable techniques may be used to interpret sensor 116 data. For example, camera and/or LIDAR image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input vehicle sensor 116 data, e.g., an image, and then provide as output, for each of one or more respective regions of interest in the image, an identification of a user or an indication that no user is present in the respective region of interest. Further, a coordinate system (e.g., polar or cartesian) applied to an area proximate to the vehicle 102 can be applied to specify locations and/or areas (e.g., according to the vehicle 102 coordinate system, translated to global latitude and longitude geo-coordinates, etc.) of a user identified from sensor 116 data. Yet further, the vehicle computer 120 could employ various techniques for fusing (i.e., incorporating into a common coordinate system or frame of reference) data from different sensors 116 and/or types of sensors 116, e.g., LIDAR, radar, and/or optical camera data.

The vehicle computer 120 can actuate one or more components 112 to control vehicle operation. For example, the vehicle computer 120 can actuate a brake component 112 to stop the vehicle 102. As another example, the vehicle computer 120 can actuate a propulsion component 112 to operate the vehicle 102 through the area 205.

Figure 9:
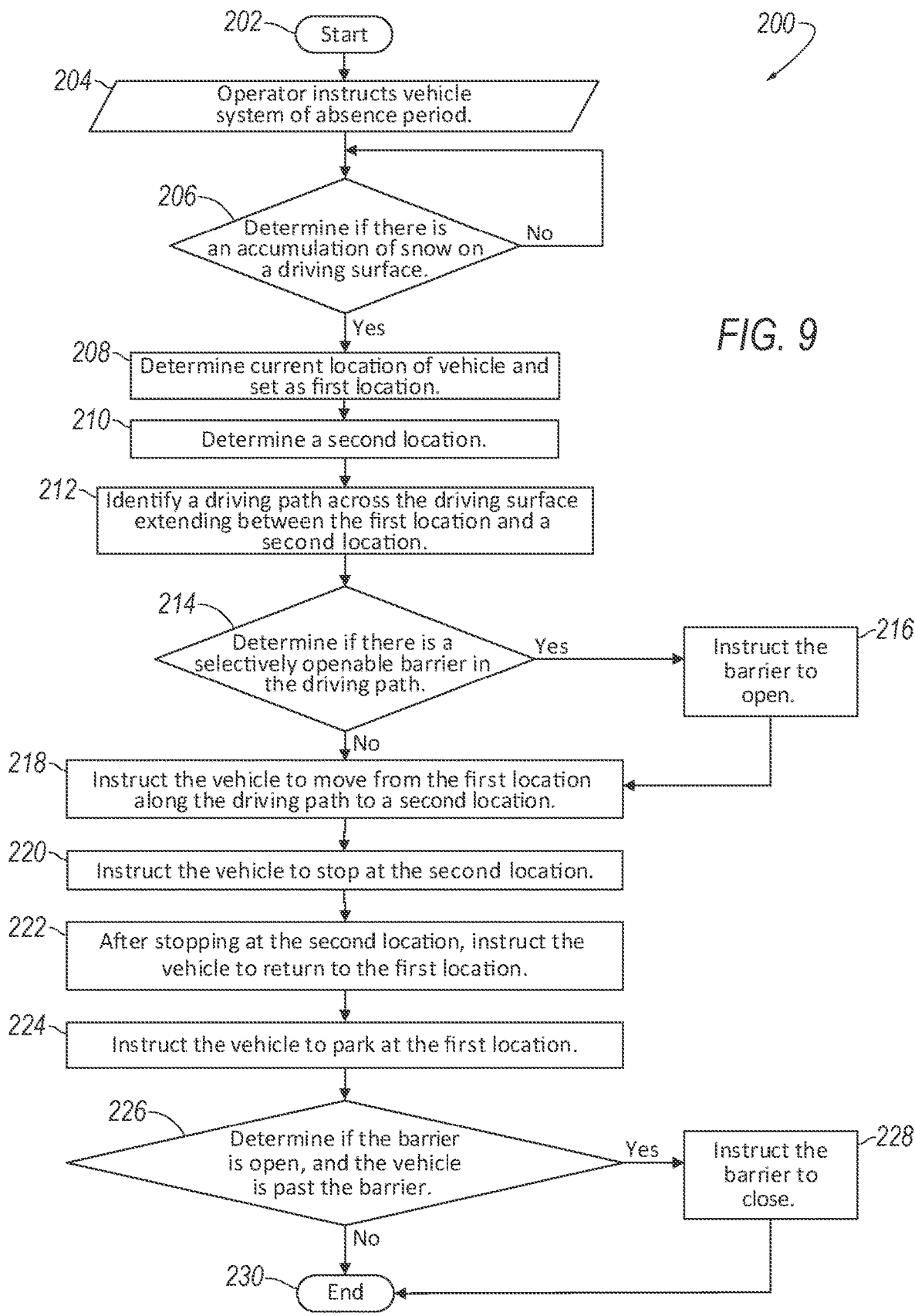
FIG. 9 is a flow chart of an example process to generate tire tracks in the snow.

FIG. 9 is a diagram of an example process 200 executed in the computing device 120, 130, 108 according to program instructions stored in a memory thereof for generating snow tracks. Process 200 includes multiple blocks that can be executed in the illustrated order. Process 200 could alternatively or additionally include fewer blocks or can include the blocks executed in different orders.

Process 200 begins in a start block 202. In the block 202, the computing device 120, 130, 108 receives data from one or more vehicle sensors 116 via the vehicle network, from the remote server 108 via the network 110, from the structure sensors 126 via the network 110, and/or from the user device 106 via the network 110 as discussed above. The process 200 continues in a block 204.

In the block 204, the user uses the user device 106 to instruct the vehicle snow track system 100 of a current or anticipated operating window. The computing device 120, 130, 108 may use the instructions to determine the period of time during which the process 200 is to be executed. The process 200 continues in a block 206.

In the block 206, the computing device 120, 130, 108, based on weather forecast information via the server 108 and measured snow accumulation as may be provided by structure sensors, determines whether the snow accumulation, if any, meets a threshold level. If the threshold is met, the process 200 continues to a block 208. Otherwise, the process 200 cycles back to the block 206 to continue checking for the accumulation of snow.

In the block 208, the current location of the vehicle 102 is determined based on data from at least the vehicle sensors 116 and set as the first location. The process 200 continues in a block 210.

In the block 210, a second location for the vehicle 102' is determined. An example second location is at or proximate to the street-to-driveway intersection 148. The process 200 continues in a block 212.

In the block 212, the first driving path 142 between the first location of the vehicle 102 and the second location of the vehicle 102' is identified. The process 200 continues in a block 214.

In the block 214, a determination is made as to whether there is a selectively openable barrier 140 in the driving path 142. A determination of the presence of barrier can be made at least in part using data from the vehicle sensors 116. A determination of whether the barrier is selectively openable may be made with the aid of the vehicle communications module 118. When there is a selectively openable barrier in the driving path, the process 200 cycles to a block 216. Otherwise, the process 200 continues in a block 218.

In the block 216, the barrier 140 is instructed to open. Communication of the instruction is facilitated by the vehicle communications module 118, the structure communications module 128, and the system network 110. The process 200 then continues in the block 218.

In the block 218, the vehicle 102 is instructed to move from the first location to the second location. The process 200 then continues in a block 220.

In the block 220, the vehicle 102 is instructed to stop at the second location. The process 200 then continues in a block 222.

In the block 222, the vehicle is instructed to return to the first location. A possible modification would have the vehicle 102 return to a third location that is proximate to or identical to the first location. The process 200 then continues in a block 224.

In the block 224, the vehicle is instructed to park at the first location. The process 200 then continues in a block 226.

In the block 226, a determination is made as to whether the barrier 140 is open and the vehicle 102 is past the barrier 140. If yes to both, the process 200 then cycles to a block 228. Otherwise, the process 200 then continues in a block 230.

In the block 228, the barrier is instructed to close. The process 200 then cycles to the block 230.

In the block 230, the computing device 120, 130, 108 determines whether to continue the process 200. For example, the computing device 120, 130, 108 can determine not to continue when the vehicle 102 is powered off. Conversely, the computing device 120, 130, 108 can determine to continue when the vehicle 102 is powered on. If the vehicle computer 120 determines to continue, the process 200 returns to the block 206. Otherwise, the process 200 ends.

Figure 10:
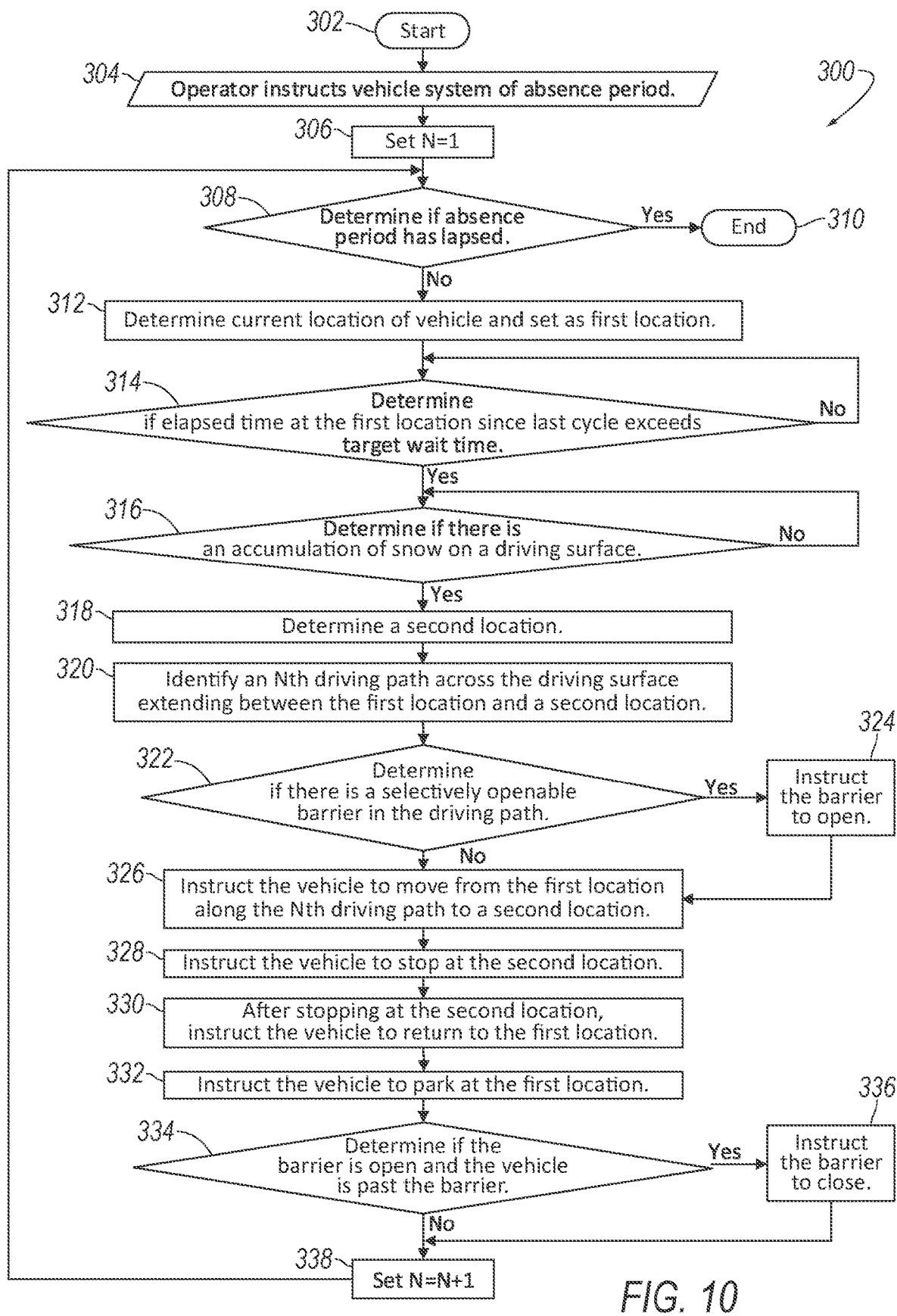
FIG. 10 is a flow chart of an alternative example process to generate tire tracks in the snow.

FIG. 10 is a diagram of an alternative example process 300 executed in the computing device 120, 130, 108 according to program instructions stored in a memory thereof for generating snow tracks. Process 300 includes multiple blocks that can be executed in the illustrated order. Process 300 could alternatively or additionally include fewer blocks or can include the blocks executed in different orders.

Process 300 begins in a start block 302. In the block 302, the computing device 120, 130, 108 receives data from one or more vehicle sensors 116 via the vehicle network, from the remote server 108 via the network 110, from the structure sensors 126 via the network 110, and/or from the user device 106 via the network 110 as discussed above. The process 300 continues in a block 304.

In the block 304, the user uses the user device 106 to instruct the vehicle snow track system 100 of a current or anticipated operating window. The computing device 120, 130, 108 may use the instructions to determine the period of time during which the process 300 is to be executed. The process 300 continues in a block 306.

In the block 306, a variable N is assigned the value of one (1). The process 300 continues in a block 308.

In the block 308, a determination is made as to whether the operating window established by the user in block 304 has lapsed. If the operating window has lapsed, then the process 300 cycles to a block 310. Otherwise, the process 300 continues in a block 312.

In the block 310, the process 300 ends.

In the block 312, the current location of the vehicle 102 is determined based on data from at least the vehicle sensors 116 and set as the first location. The process 300 continues in a block 314.

In the block 314, a determination is made as to whether a threshold minimum time period of a predetermined magnitude has elapsed since the most recent movement of the vehicle 102 from the parking area 132. This block 314 aids in preventing the vehicle 102 from moving to make tracks at a time close to when vehicle 102 was last moved. For example, a five hour time period may be determined to be the minimum time between vehicle movement cycles to avoid having the movement of the vehicle 102 being viewed by an observer as suspicious. If the minimum time period has not elapsed, the process 300 cycles back to the block 314 to continue checking. If the minimum time period has elapsed, the process 300 continues in a block 316.

In the block 316, the computing device 120, 130, 108, based on weather forecast information via the server 108 and measured snow accumulation as may be provided by structure sensors, determines whether the snow accumulation, if any, meets a threshold level. If the threshold is met, the process 300 continues to a block 318. Otherwise, the process 300 cycles back to the block 316 to continue checking for the accumulation of snow.

In the block 318, a second location for the vehicle 102' is determined. An example second location is at or proximate to the street-to-driveway intersection 148. The process 300 continues in a block 320.

In the block 320, an Nth driving path 160, 162, 164, 166 between the first location of the vehicle 102 and the second location of the vehicle 102' is identified. A possible modification would have the vehicle 102 return to a third location that is proximate to or identical to the first location, and subsequently to a fourth location that is proximate to or identical to the second location. The process 300 continues in a block 322.

In the block 322, a determination is made as to whether there is a selectively openable barrier 140 in the driving path 142. A determination of the presence of barrier can be made at least in part using data from the vehicle sensors 116. A determination of whether the barrier is selectively openable may be made with the aid of the vehicle communications module 118. When there is a selectively openable barrier in the driving path, the process 300 cycles to a block 324. Otherwise, the process 300 continues in a block 326.

In the block 324, the barrier 140 is instructed to open. Communication of the instruction is facilitated by the vehicle communications module 118, the structure communications module 128, and the system network 110. The process 300 then continues in the block 326.

In the block 326, the vehicle 102 is instructed to move from the first location to the second location. The process 300 then continues in a block 328.

In the block 328, the vehicle 102 is instructed to stop at the second location. The process 300 then continues in a block 330.

In the block 330, the vehicle 102' is instructed to return to the first location. A possible modification would have the vehicle 102 return to a third location that is proximate to or identical to the first location. The process 200 then continues in a block 224.

In the block 332, the vehicle 102 is instructed to park at the first location. The process 300 then continues in a block 334.

In the block 334, a determination is made as to whether the barrier 140 is open and the vehicle 102 is past the barrier 140. If yes to both, the process 300 then cycles to a block 336. Otherwise, the process 300 then continues in a block 338.

In the block 336, the barrier 140 is instructed to close. The process 300 then cycles to the block 338.

In the block 338, the value N is set equal to N+1. The process 300 then cycles to the block 308.

Figure 11:
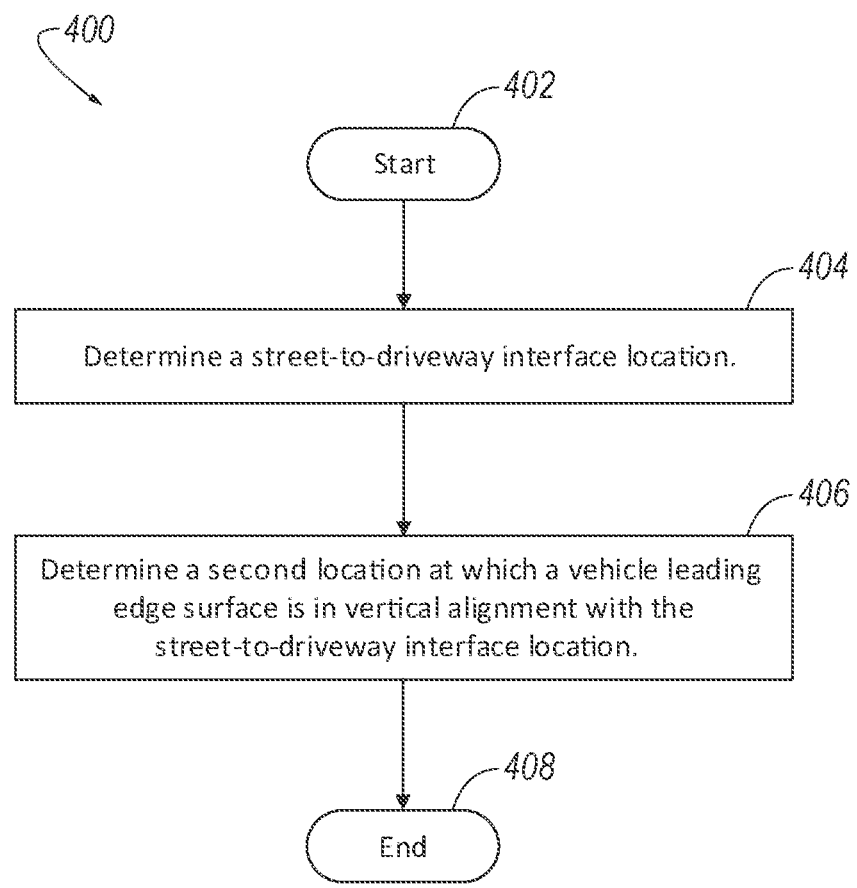
FIG. 11 is a flow chart of an example process to determine a second location for the vehicle.

FIG. 11 is a diagram of an example process 400 of establishing the second location of block 208 of FIG. 9 and block 318 of FIG. 10. The process 400 is started in a block 402, and then continues in a block 404.

In the block 404, using available sensors and map data as may be appropriate, a street-to-driveway intersection is determined. The process 400 then continues in a block 406.

In the block 406, a second location of the vehicle 102' is determined to be where a vehicle leading edge surface 146 is in vertical alignment with the street-to-driveway intersection 148 location. The process 400 then continues in a block 408.

In the block 408, with the second position of the vehicle established, the process 400 is ended.

Figure 12:
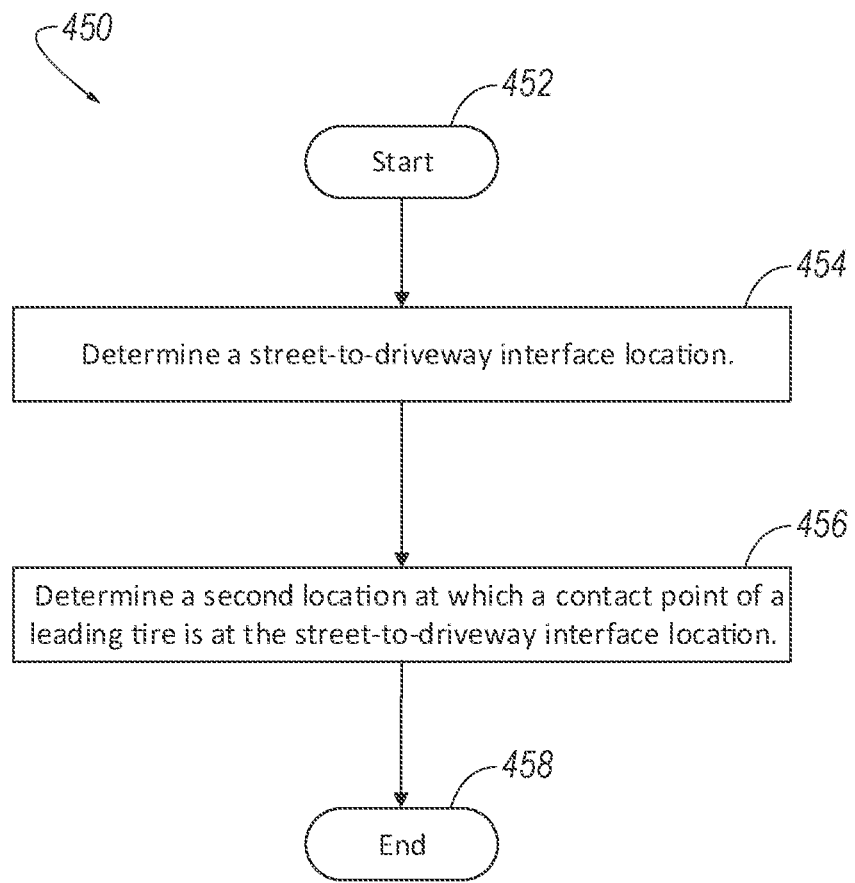
FIG. 12 is a flow chart of an alternative example process to determine a second location for the vehicle.

FIG. 12 is a diagram of a second alternative example process 450 of establishing the second location of block 208 of FIG. 9 and block 318 of FIG. 10. The process 450 is started in a block 452, and then continues in a block 454.

In the block 454, using available sensors and map data as may be appropriate, a street-to-driveway intersection is determined. The process 450 then continues in a block 456.

In the block 456, a second location of the vehicle 102' is determined to be where a contact point of a leading tire 156 is at the street-to-driveway intersection 148 location. The process 450 then continues in a block 458.

In the block 458, with the second position of the vehicle established, the process 450 is ended.

Figure 13:
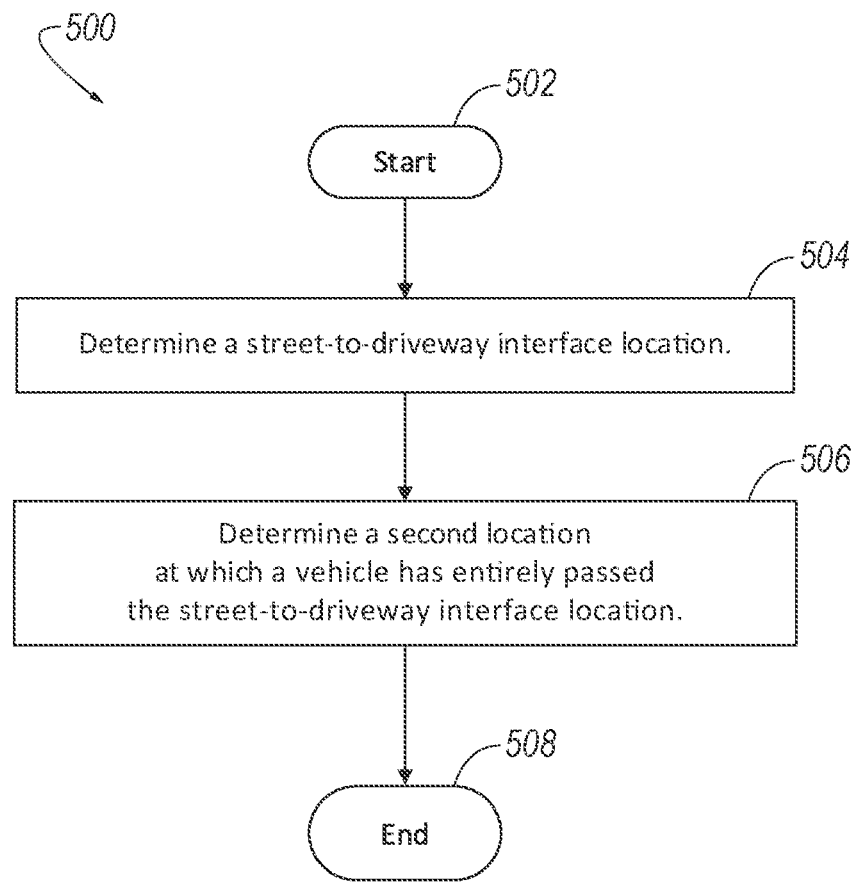
FIG. 13 is a flow chart of a second alternative example process to determine a second location for the vehicle.

FIG. 13 is a diagram of a third alternative example process 500 of establishing the second location of block 208 of FIG. 9 and block 318 of FIG. 10. The process 500 is started in a block 502, and then continues in a block 504.

In the block 504, using available sensors and map data as may be appropriate, a street-to-driveway intersection is determined. The process 500 then continues in a block 506.

In the block 506, a second location of the vehicle 102' is determined to be where the vehicle 102' has entirely passed the street-to-driveway intersection 148 location. The process 500 then continues in a block 508.

In the block 508, with the second position of the vehicle established, the process 500 is ended.

Figure 14:
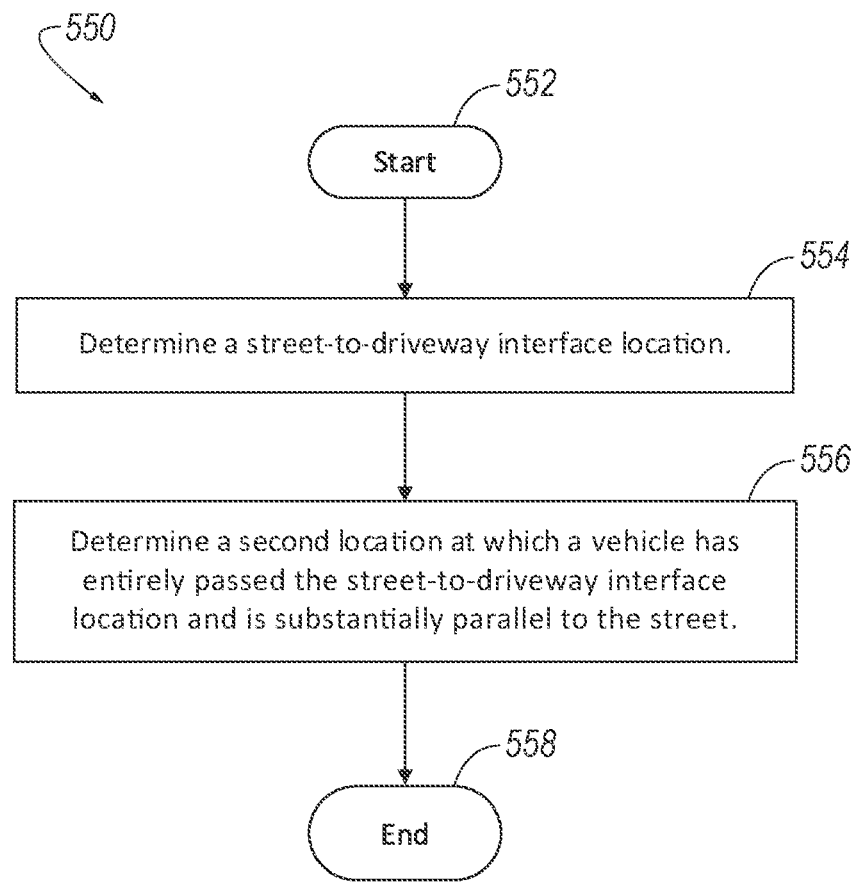
FIG. 14 is a flow chart of a third alternative example process to determine a second location for the vehicle.

FIG. 14 is a diagram of a fourth alternative example process 550 of establishing the second location of block 208 of FIG. 9 and block 318 of FIG. 10. The process 550 is started in a block 552, and then continues in a block 554.

In the block 554, using available sensors and map data as may be appropriate, a street-to-driveway intersection is determined. The process 550 then continues in a block 556.

In the block 556, a second location of the vehicle 102' is determined to be where the vehicle 102' has entirely passed the street-to-driveway intersection 148 location and is substantially parallel to the street. The process 550 then continues in a block 558.

In the block 558, with the second position of the vehicle established, the process 550 is ended.

Figure 15:
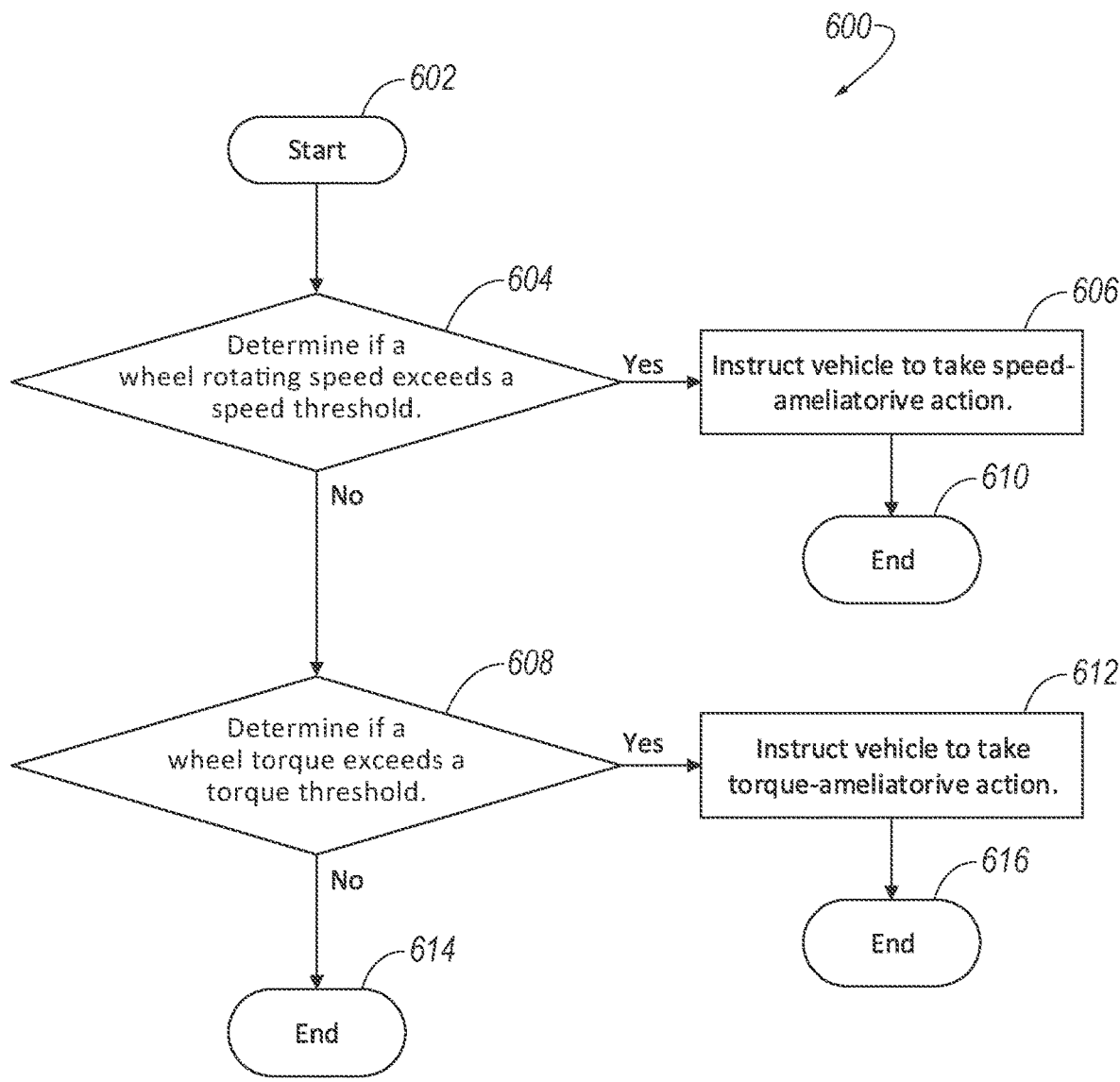
FIG. 15 is a flow chart of a supplementary process for addressing difficult surface conditions.

FIG. 15 is a diagram of an example process 600 for responding to addressing difficulties experienced by the vehicle 102 in moving as directed. Such difficulties may be imposed by excessively slippery conditions, or an impediment in the driving path of the vehicle 102 such as a brick or a pothole. The example process 600 may supplement the blocks 218 and 222 of the process 200 shown in FIG. 9 and the blocks 326 and 330 of the process 300 shown in FIG. 10. The process 600 is started in a block 602 responsive the vehicle 102 being instructed to move, and then continues in a block 604.

In the block 604, a determination is made as to whether a wheel rotating speed of the vehicle 102 has exceeded a wheel rotating speed threshold. If the wheel rotating speed threshold has been exceeded, as may occur on a slippery surface, the process 600 cycles to a block 606. Otherwise, the process 600 then continues to a block 608.

In the block 606, the vehicle 102 is instructed to take speed-ameliorative action, that is an action that will reduce the wheel rotating speed and improve drive traction. One example of such action is to engage one or more additional drive wheels, as may be done in vehicles equipped with traction control and/or all-wheel drive. If it is possible to gain sufficient traction, the vehicle 102 may be directed to return to the first location and parked there. If it is not possible to gain sufficient traction, it the vehicle 102 may be parked where it lost traction. Follow-up attempts can be made to return the vehicle 102 to the first location when the weather data suggests more favorable traction conditions. The process 600 then continues to a block 610.

In the block 610, the process 600 ends with the vehicle 102 remaining where it lost traction or in the first location. As noted above, the computer 130 could be programmed to attempt to return the vehicle 102 to the first location when surface conditions are determined to be more favorable.

In the block 608, a determination is made as to whether a wheel torque of the vehicle 102 has exceed a torque threshold. If the torque threshold has been exceeded, as may occur if the wheel comes up against impediment such as a brick or a pothole, the process 600 cycles to a block 612. Otherwise, the process 600 then continues to a block 614.

In the block 612, the vehicle 102 is instructed to take torque-ameliorative action, that is an action that will reduce the wheel torque. One example of such action is to reverse the drive direction of the vehicle 102. If reversing direction allows the vehicle to move without incurring the previous high wheel torque, the vehicle 102 may be directed to return to the first location and parked there. If it is not possible to move the vehicle in either direction without incurring the high wheel torque, or if the vehicle engages the same or another obstacle in the attempt to return to the first location, the vehicle 102 may be parked where it was blocked. If the vehicle 102 is blocked in a location that makes it a hazard to others, the user may need to be notified via the user device that the vehicle 102 may need to be towed. The process 600 then continues to a block 616.

In the block 616, the process 600 ends with the vehicle 102 remaining where it became blocked or in the first location.

In the block 614, the current process 600 and control reverts to the appropriate portion of the parent process 200 or 300.

Figure 16:
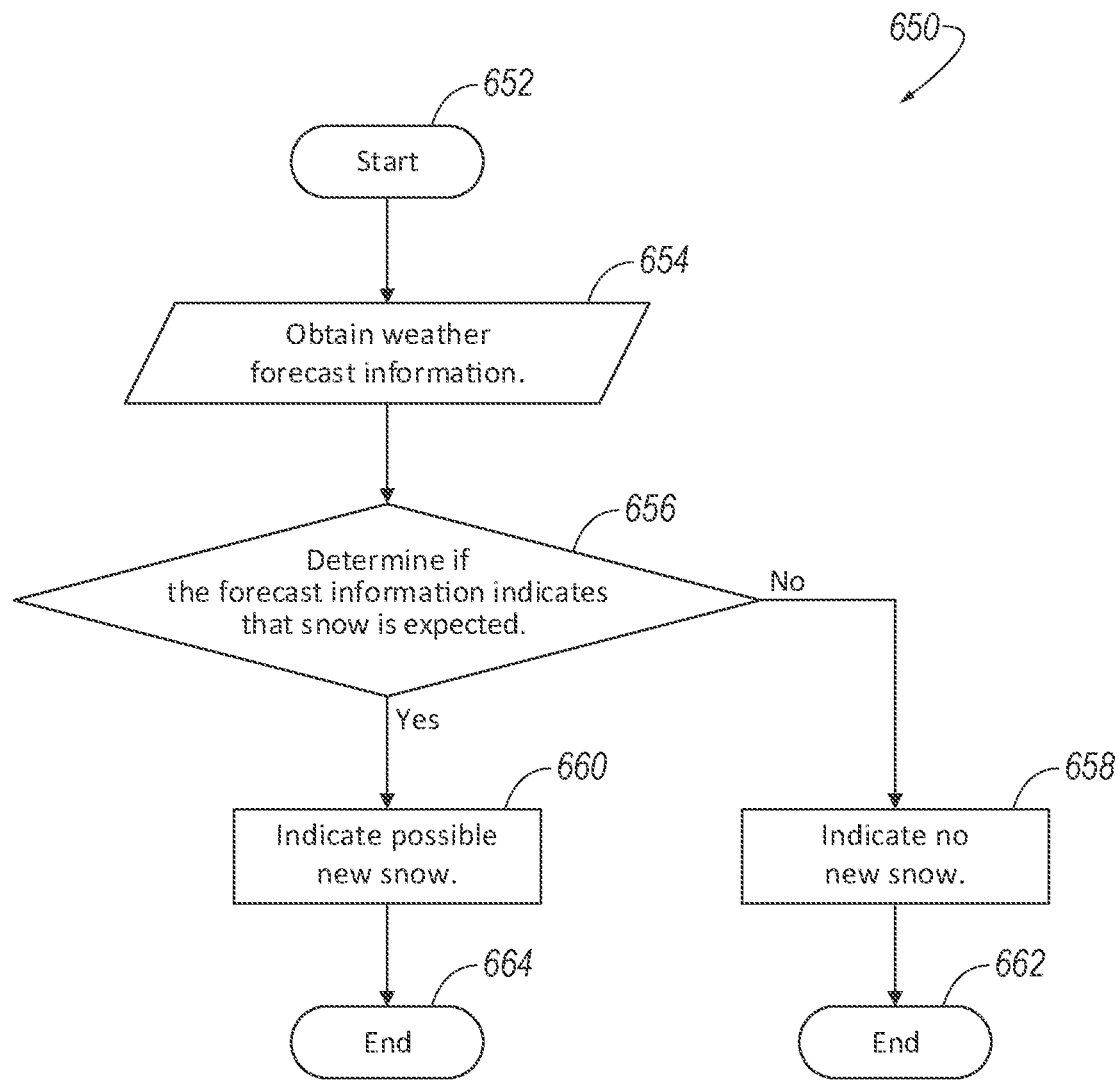
FIG. 16 is a flow chart of a supplementary process for detecting snow accumulation.

FIG. 16 is a diagram of an example process 650 for determining if there is an accumulation of snow. The example process 650 may supplement the block 206 of the process 200 shown in FIG. 9 and the block 316 of the process 300 shown in FIG. 10. The process 650 is started in a block 652, responsive the initiation of the snow accumulation inquiries of the referenced blocks of the processes 200 and 300. The process 650 then continues in a block 654.

In the block 654, weather forecast information is obtain from the server 108 via the network 110. The process 650 then continues to a block 656.

In the block 656, a determination is made as to whether the forecast is predicting snow or conditions in which snow is likely. If the forecast is not for snow, nor for conditions for which snow is likely, the process 650 cycles to a block 658. Otherwise, the process 650 continues to a block 660.

In the block 658, an indication of no new snow is provided. This indication may be provided to the block 206 of the process 200 shown in FIG. 9 and the block 316 of the process 300 shown in FIG. 10. The process 650 continues to a block 662.

In the block 662, the process 650 ends with the indication having been provided to process 200 or 300.

In the block 660, an indication of new snow likely is provided. This indication may be provided to the block 206 of the process 200 shown in FIG. 9 and the block 316 of the process 300 shown in FIG. 10. The process 650 continues to a block 664.

In the block 664, the process 650 ends with the indication having been provided to process 200 or 300.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A computing device, programmed to:
   upon detecting a target accumulation of snow on a driving surface, identify a first driving path from a first location to a second location; and
   operate a vehicle from the first location to the second location along the first driving path and then to a third location identical to or proximate to the first location.

2. The computing device of claim 1, further programmed to, upon determining that there is an openable barrier disposed in the driving path, instruct the openable barrier to open prior to the vehicle reaching the openable barrier.

3. The computing device of claim 2, further programmed to instruct the openable barrier to close after the vehicle has been operated to the third location and after the vehicle has passed the openable barrier.

4. The computing device of claim 1, further programmed to determine that the vehicle has reached the second location by determining:
   that a vertical projection of a leading edge surface of the vehicle is in alignment with a street-to-driveway intersection,
   that a contact point of a leading tire has reached a street-to-driveway intersection, or
   that the vehicle has entirely passed a street-to-driveway intersection.

5. The computing device of claim 4, further programmed to instruct the vehicle to turn a pair of steerable wheels as the vehicle passes the street-to-driveway intersection in moving to the second location and to instruct the vehicle to turn the pair of steerable wheels as the vehicle is operated to the third location.

6. The computing device of claim 1, further programmed to operate the vehicle based on determining that a wheel rotating speed exceeds a wheel rotating speed threshold or that a wheel torque exceeds a wheel torque threshold.

7. The computing device of claim 6, further programed to operate the vehicle to the third location when it is determined that the wheel rotating speed threshold has been exceeded and/or when it is determined that the wheel torque threshold has been exceeded.

8. The computing device of claim 1, further programmed to instruct vehicle windows to darken prior to instructing the vehicle to move.

9. The computing device of claim 1, further programmed to, after the vehicle has been operated to the second location, instruct the vehicle to:
   identify a second driving path across the driving surface extending between the second location and the third location; and
   instruct the vehicle to move along the second driving path to the third location.

10. The computing device of claim 9, further programmed to:
    identify a third driving path across the driving surface extending between the third location and a fourth location that is identical to or proximate to the second location;
    instruct the vehicle to move along the third driving path to the fourth location;
    identify a fourth driving path across the driving surface extending between the fourth location and a fifth location that is identical to or proximate to the first location;
    instruct the vehicle to move along the fourth driving path to the fifth location; and
    after it has been determined that the vehicle has stopped at the fifth location, instruct the vehicle to park.

11. The computing device of claim 10, further programmed to identify the third driving path after the vehicle has been operated to the third location and remained there for a predetermined period of time.

12. The computing device of claim 1, further programmed to acquire information from a camera to determine whether there has been an accumulation of snow on the driving surface.

13. The computing device of claim 1, further programmed to:
    prior to instructing the vehicle to move, determine if any vehicle sensors are obstructed by snow;
    if any of the vehicle sensors are obstructed by the snow, instruct the vehicle to clear the snow;
    determine if the snow has been sufficiently cleared from the vehicle sensors; and
    if the snow has not been sufficiently cleared from the vehicle sensors, instruct the vehicle to park in its then-current location.

14. The computing device of claim 1, further programmed to confirm receipt of an instruction from a user to enter a remote mode prior to instructing the vehicle to move.

15. The computing device of claim 1, further programmed to confirm that the first location is at a predetermined geographic location prior to instructing the vehicle to move.

16. The computing device of claim 1, further programmed to:
    monitor a weather forecast for a forecast of snow; and
    determine that the weather forecast includes a forecast of snow prior to detecting the target accumulation of snow.

17. The computing device of claim 1, further programmed to detect the target accumulation of snow based on a combination of sensor data and weather forecast data.

18. The computing device of claim 1, wherein the target accumulation depends on an expected temperature.

19. The computing device of claim 1, wherein the target accumulation depends on expected cloudy weather.

20. A method of responding to snow accumulation on a driving surface proximate to a vehicle, the method comprising the steps of:

determining whether there is a target accumulation of snow on the driving surface; and when it is determined that there is an accumulation of snow on the driving surface:

identifying a driving path across the driving surface between a first location and a second location;

operating the vehicle to move along the driving path to the second location; and operating the vehicle from the second location to a third location that is identical to or proximate to the first location.

\* \* \* \* \*